HIGH SPEED SIGNATURE SIDE STITCHER

Filed Oct. 29, 1963 12 Sheets-Sheet 1

INVENTORS
PAUL E. KLEINEBERG
NORWOOD E. TRESS
BY
Kenyon & Kenyon
ATTORNEYS

Sept. 21, 1965 P. E. KLEINEBERG ETAL 3,207,404

HIGH SPEED SIGNATURE SIDE STITCHER

Filed Oct. 29, 1963 12 Sheets-Sheet 2

INVENTORS
PAUL E. KLEINEBERG
NORWOOD E. TRESS
BY
Kenyon & Kenyon
ATTORNEYS

INVENTORS
PAUL E. KLEINEBERG
NORWOOD E. TRESS
BY
Kenyon & Kenyon
ATTORNEYS

Sept. 21, 1965 P. E. KLEINEBERG ETAL 3,207,404
HIGH SPEED SIGNATURE SIDE STITCHER
Filed Oct. 29, 1963 12 Sheets-Sheet 4

INVENTORS
PAUL E. KLEINEBERG
NORWOOD E. TRESS
BY
Kenyon & Kenyon
ATTORNEYS

INVENTORS
PAUL E. KLEINEBERG
NORWOOD E. TRESS
BY
Kenyon & Kenyon
ATTORNEYS

INVENTORS
PAUL E. KLEINEBERG
NORWOOD E. TRESS
BY Kenyon & Kenyon
ATTORNEYS

HIGH SPEED SIGNATURE SIDE STITCHER

Filed Oct. 29, 1963 12 Sheets-Sheet 7

INVENTORS
PAUL E. KLEINEBERG
NORWOOD E. TRESS
BY Kenyon & Kenyon
ATTORNEYS

Sept. 21, 1965 P. E. KLEINEBERG ETAL 3,207,404

HIGH SPEED SIGNATURE SIDE STITCHER

Filed Oct. 29, 1963 12 Sheets-Sheet 8

INVENTORS

BY PAUL E. KLEINEBERG
NORWOOD E. TRESS

Kenyon & Kenyon
ATTORNEYS

INVENTORS
PAUL E. KLEINEBERG
NORWOOD E. TRESS
BY Kenyon & Kenyon
ATTORNEYS

Sept. 21, 1965 P. E. KLEINEBERG ETAL 3,207,404

HIGH SPEED SIGNATURE SIDE STITCHER

Filed Oct. 29, 1963 12 Sheets-Sheet 10

INVENTORS
PAUL E. KLEINEBERG
NORWOOD E. TRESS
BY
Kenyon & Kenyon
ATTORNEYS

HIGH SPEED SIGNATURE SIDE STITCHER

Filed Oct. 29, 1963

INVENTORS
PAUL E. KLEINEBERG
NORWOOD E. TRESS
BY Kenyon & Kenyon
ATTORNEYS

INVENTORS
PAUL E. KLEINEBERG
NORWOOD E. TRESS
BY
Kenyon & Kenyon
ATTORNEYS

United States Patent Office 3,207,404
Patented Sept. 21, 1965

3,207,404
HIGH SPEED SIGNATURE SIDE STITCHER
Paul E. Kleineberg, Easton, and Norwood E. Tress, Allentown, Pa., assignors, by mesne assignments, to T. W. & C. B. Sheridan Company, a corporation of New York, a wholly owned subsidiary of Harris-Intertype Corp., New York, N.Y., a corporation of Delaware
Filed Oct. 29, 1963, Ser. No. 319,714
10 Claims. (Cl. 227—103)

This invention relates to signature side stitchers of the type used in the manufacture of side stitched books.

The main object is to provide a stitcher which can be operated satisfactorily at higher speed than is usual.

The invention features the use of stationary automatic stitching heads in the sense that they do not reciprocate parallel to the travel of the signature stacks pushed through the stitcher by the conveyor chain pins of the signature gatherer. Because the stitching heads, together with their equipment for feeding wire to each head and the multiplicity of head mechanism actuating bars and the like, are not thusly reciprocated, a stitcher using this invention can be operated at the higher speed.

A requirement of such stationary stitching heads is that each signature stack must be stopped during its stitching. This presents a problem because the stacks are pushed through the stitcher by the gatherer's chain pins which cannot be stopped because the pin chain extends backwardly throughout the gatherer and operates continuously.

The above problem is solved by the present invention by providing the stitcher with a pin chain looping station which loops the pin chain transversely to its normal traveling direction at a location between the gatherer and stitcher and thereby slows down the horizontal pin displacement at this location. That is to say, as each chain pin reaches the loop it detours with respect to its normal traveling direction.

Further, a second but relatively very short pin chain is arranged to run parallel to the above main pin chain opposite to its loop. This second or transfer chain has pins which engage the stacks as they approach the main chain loop and push the stacks on at their usual speed at this loop and thereby move them ahead of the detouring main chain pins. Thus the stacks are transferred past the main chain loop.

Finally, a reciprocatory signature stack gripper is provided which grips each transferred stack, advances it forwardly, beyond the reach of the transfer pin travel extent, to the previously described stationary stitching heads and leaves it there and goes back for the next stack.

The stationary stitching heads continuously cycle and side stitch each stationary signature stack. Just as each stitching operation is completed and the stitched signature stack is released with respect to the stitching heads, the main chain pin from which that stack was moved forwardly by the transfer chain pin and stack gripper operation, catches up with the stack and carries it onwardly from the stitcher.

The gripper which must reciprocate parallel to the signature stack traveling direction is simple and lightweight as compared to the stitching heads and their associated mechanisms which must be reciprocated when not using the principles of the present invention. This gripper can be reciprocated at a much higher speed and with less vibration and power consumption due to the lower reciprocation resistance of the lighter weight parts.

A specific example of a signature side stitcher embodying the principles of the present invention and showing the manner in which these principles operate is illustrated in the accompanying drawings in which.

Figures 1, 2, 3, 4:
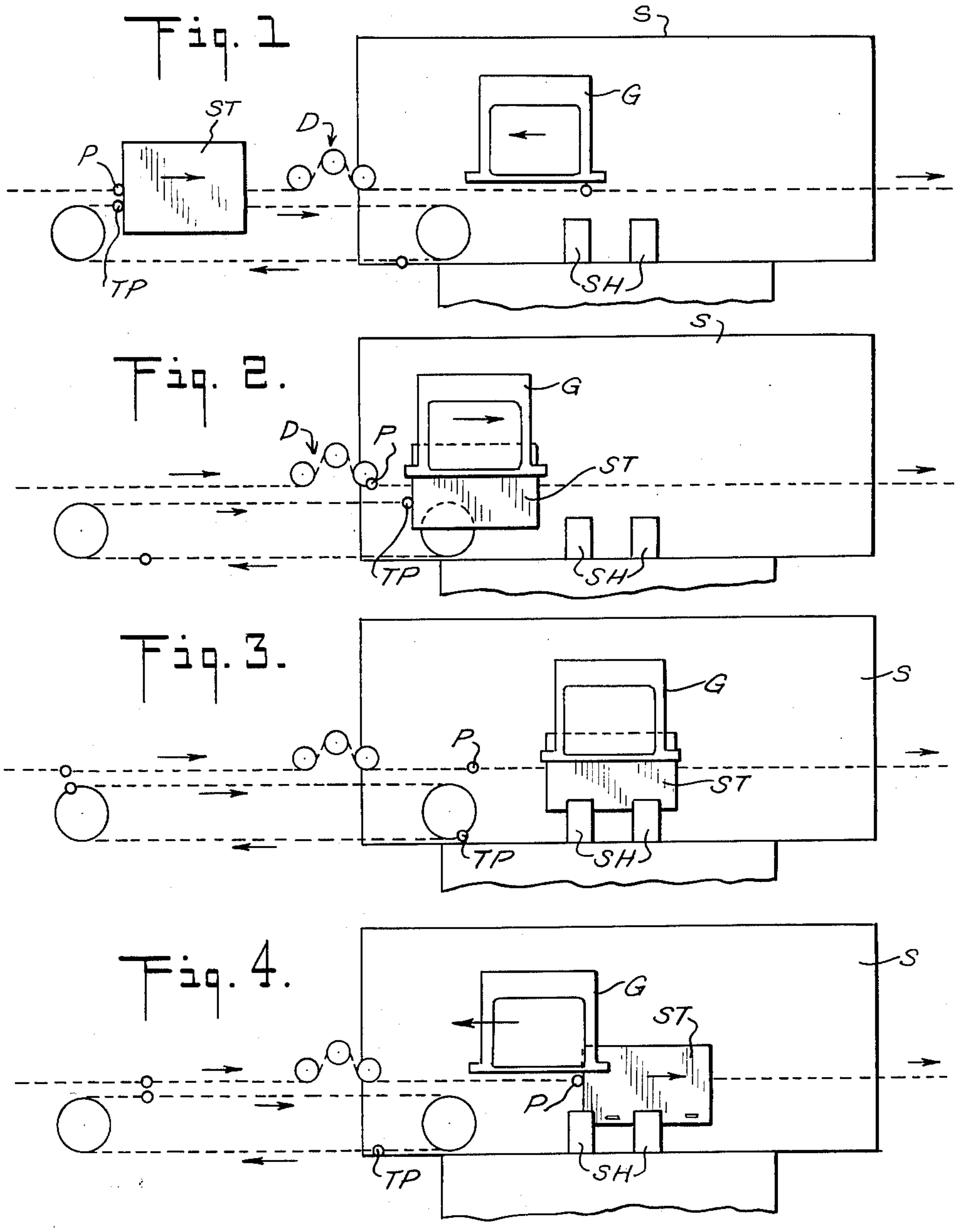
FIG. 1 is a schematic side elevation showing one main chain pin pushing a signature stack towards the stitcher with the stitcher's gripper moving backwardly and with one of the transfer chain pins engaging this stack.
FIG. 2 is like FIG. 1 but shows the transfer chain pin carrying the stack ahead of the now delayed main chain pin to the backwardly reciprocated gripper.

FIG. 3 also is like FIG. 1 but now the gripper has moved the stack to the stationary stitching heads so the latter may operate;

FIG. 4, the last of the schematic series comprising FIGS. 1–4, shows the stitched signature stack again being moved forwardly by the main chain pin which has by now caught up with this stack, with the gripper again moving backwardly as in FIG. 1.

Figure 5:
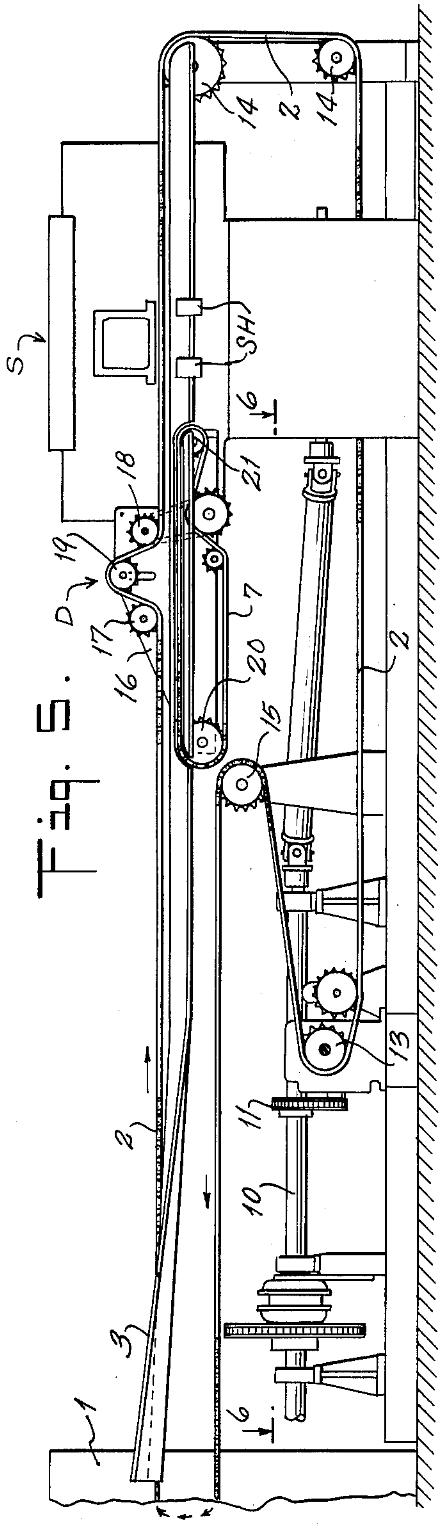
Figure 6:
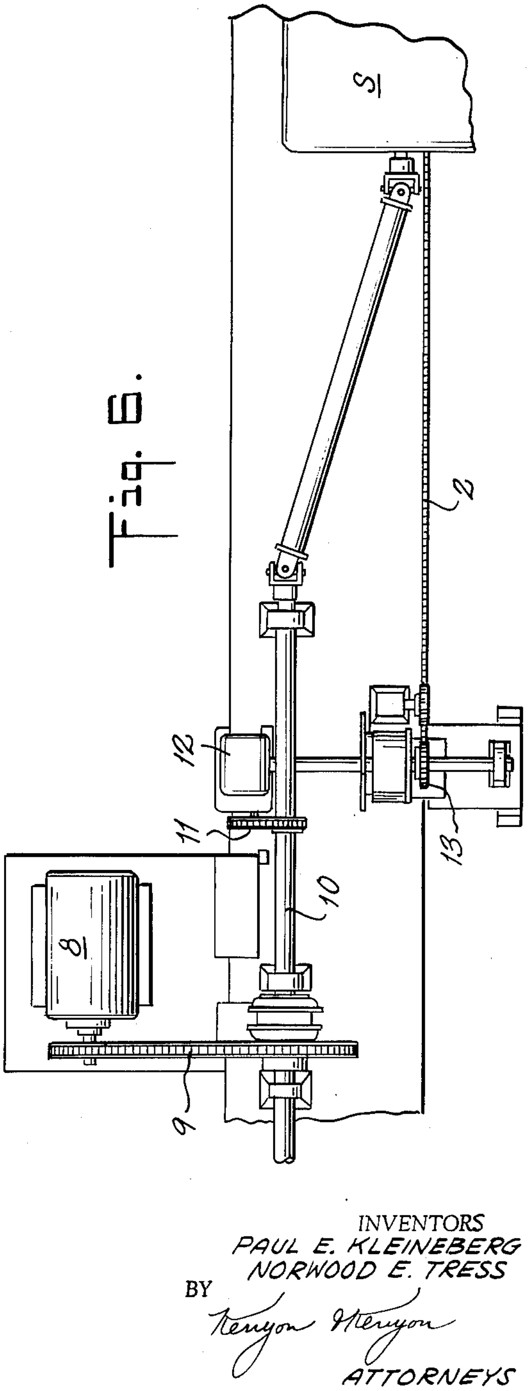
Figure 7:
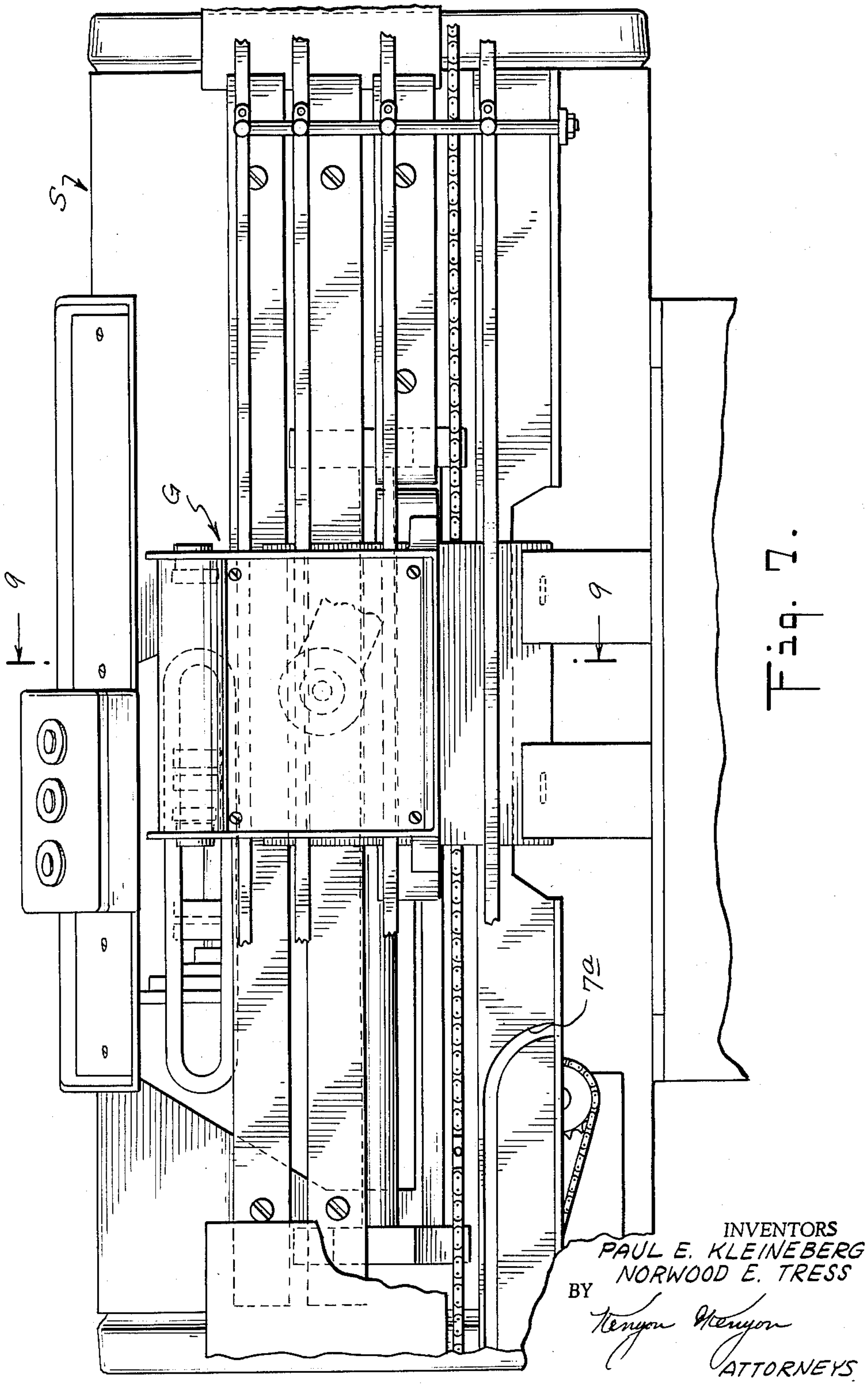
Figures 8, 9:
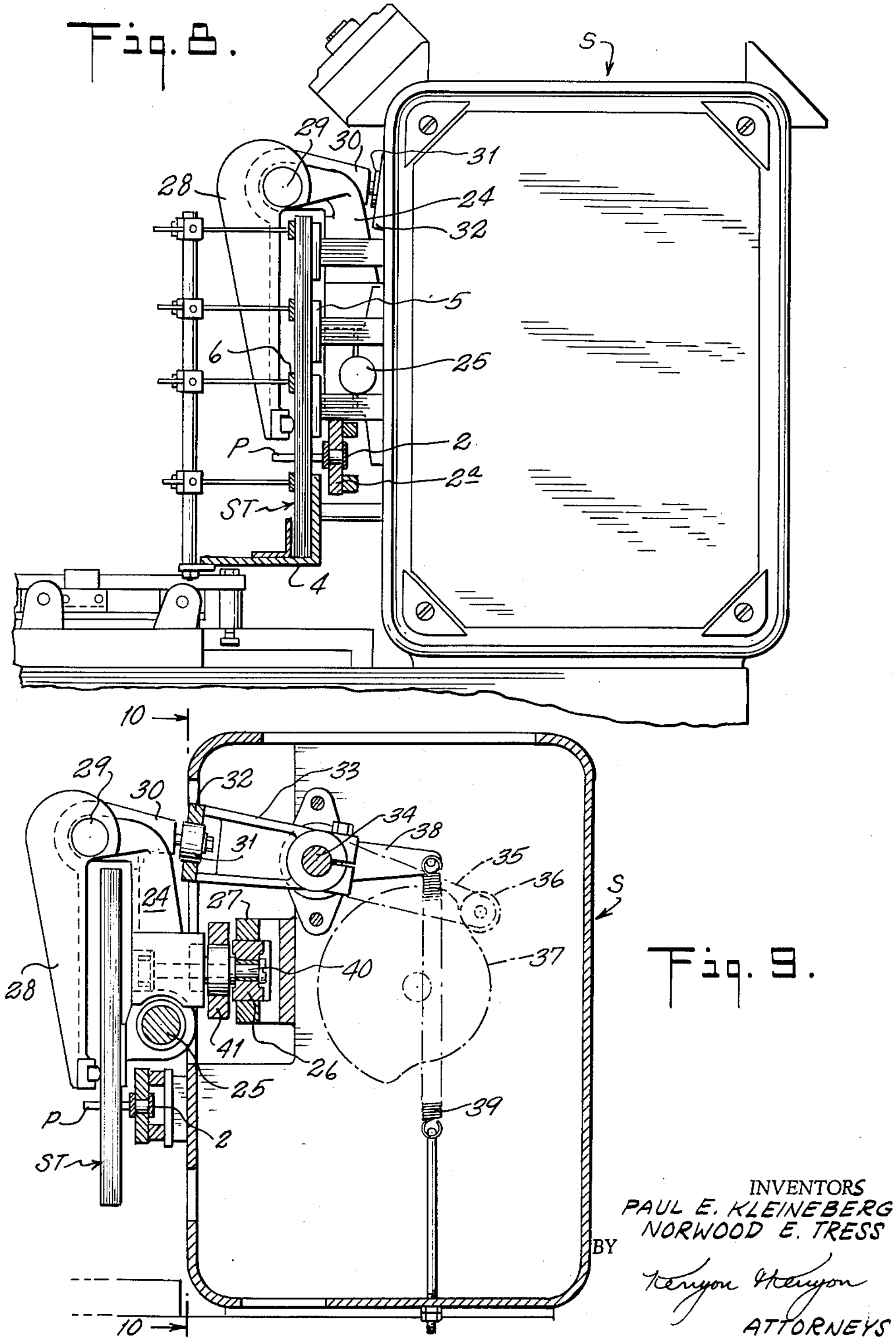
Figure 10:
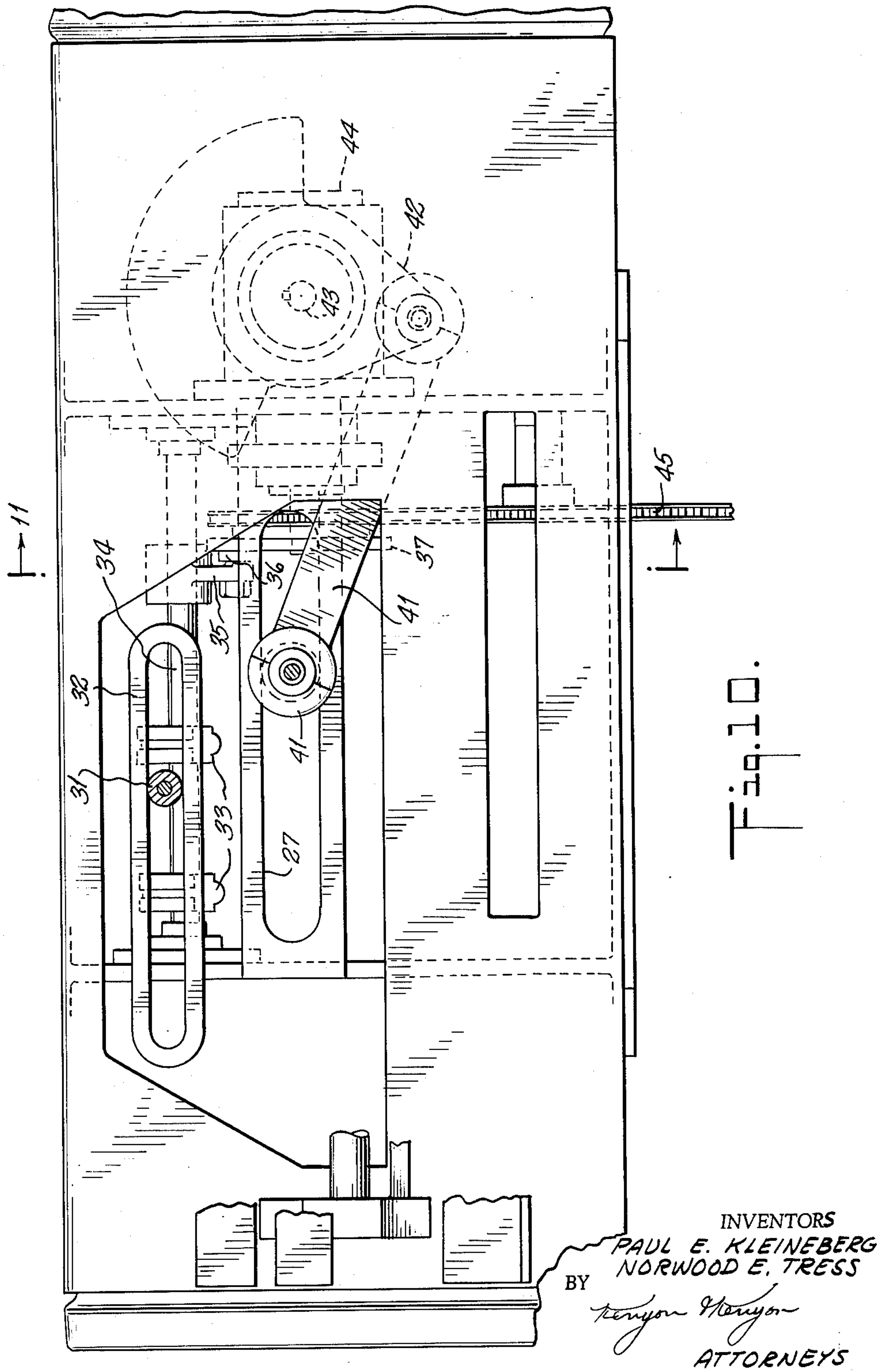
Figure 11:
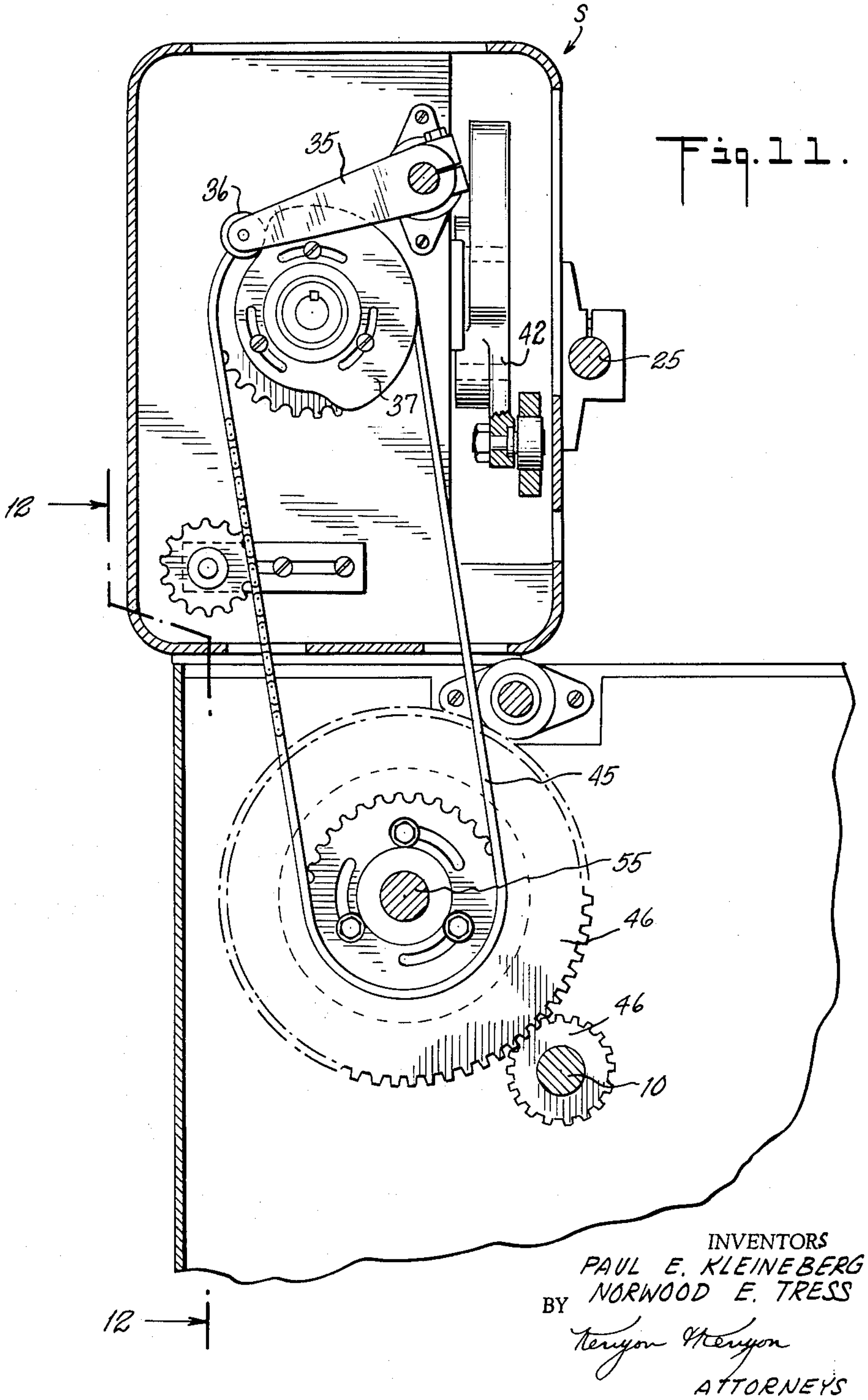
Figure 12:
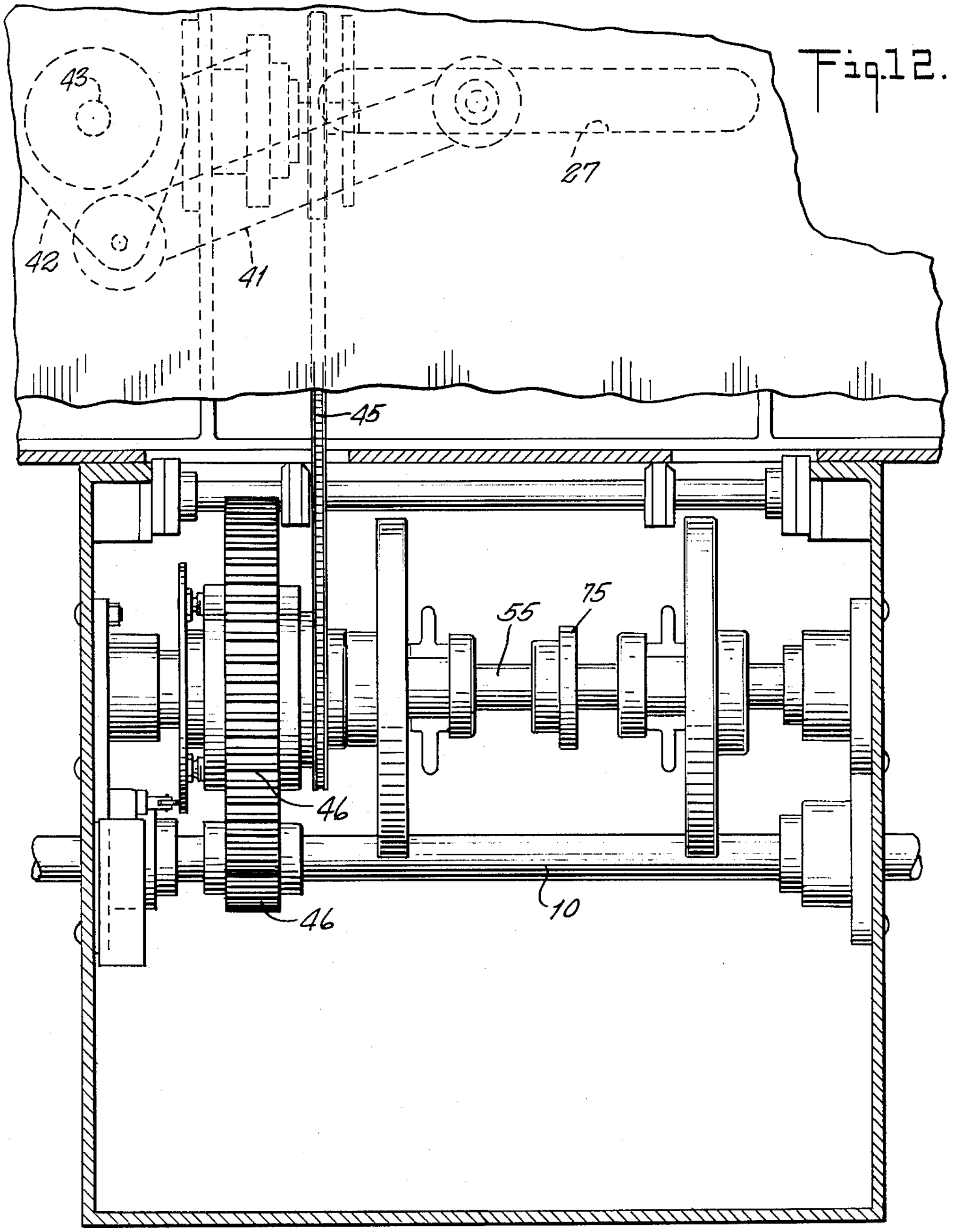
Figure 13:
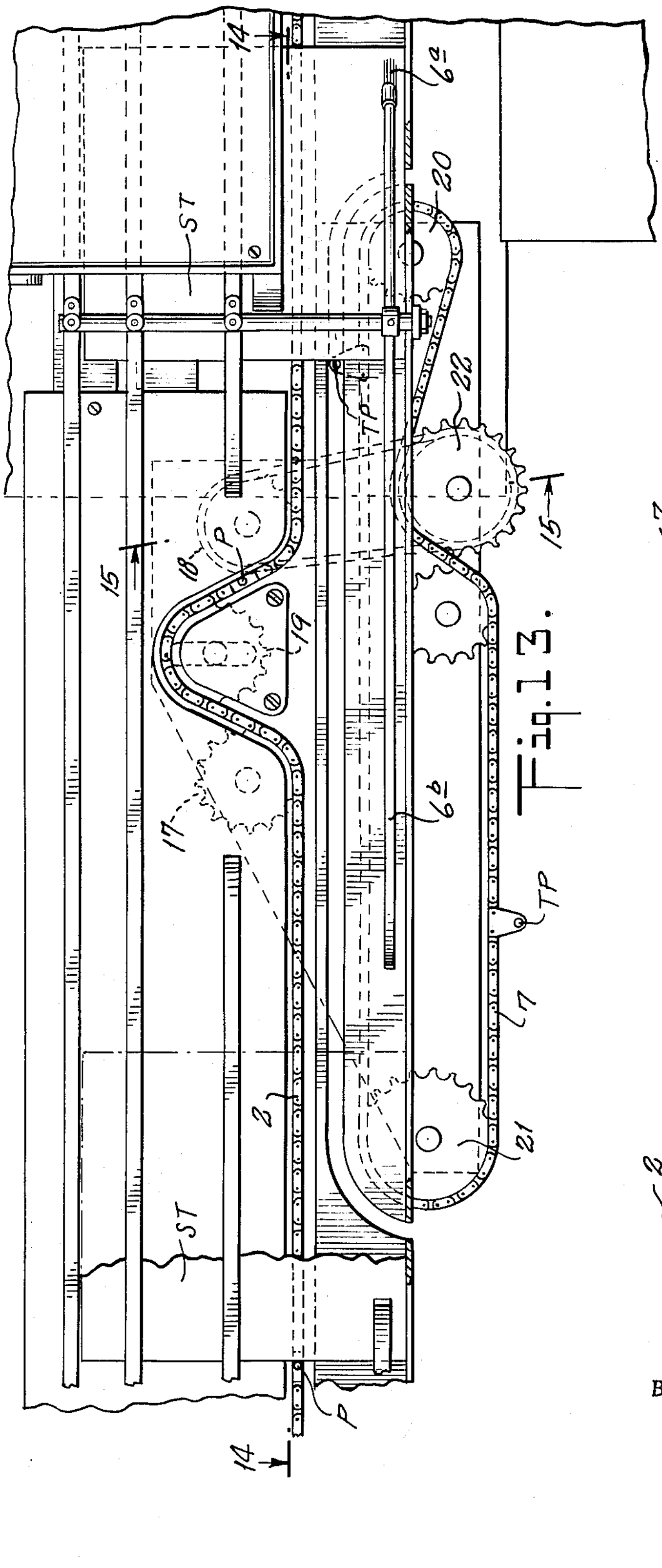
Figure 14:
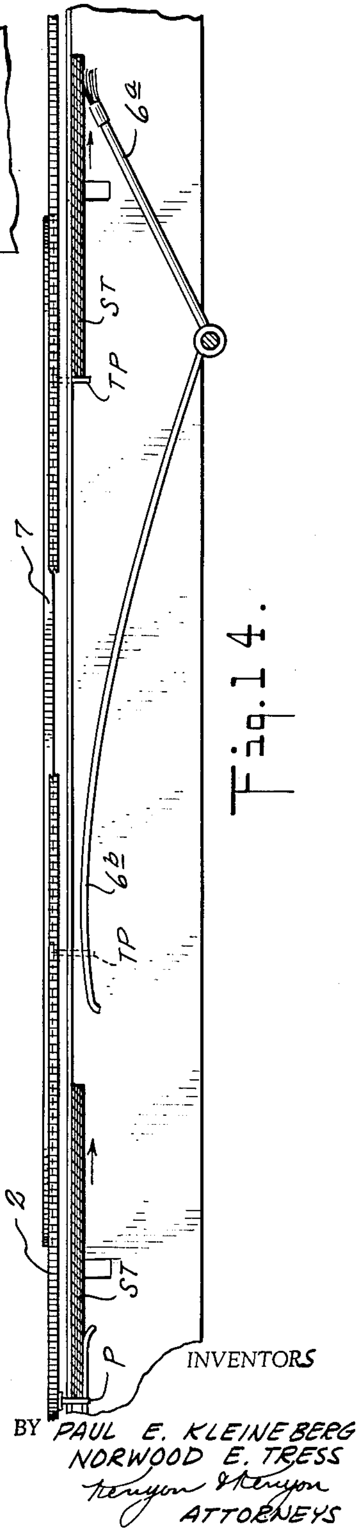
Figure 15:
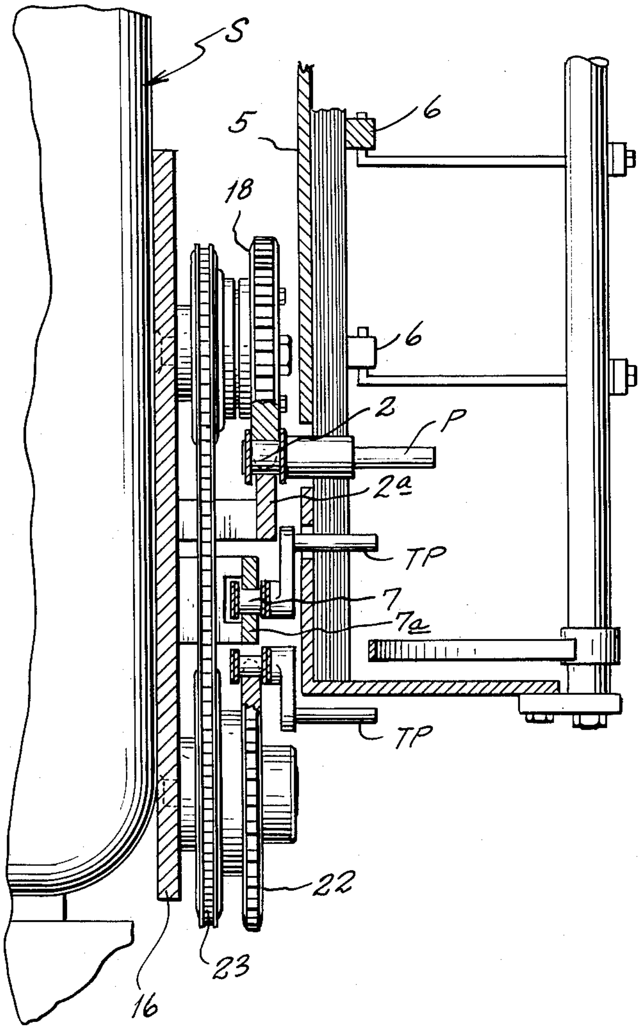
Figure 16:
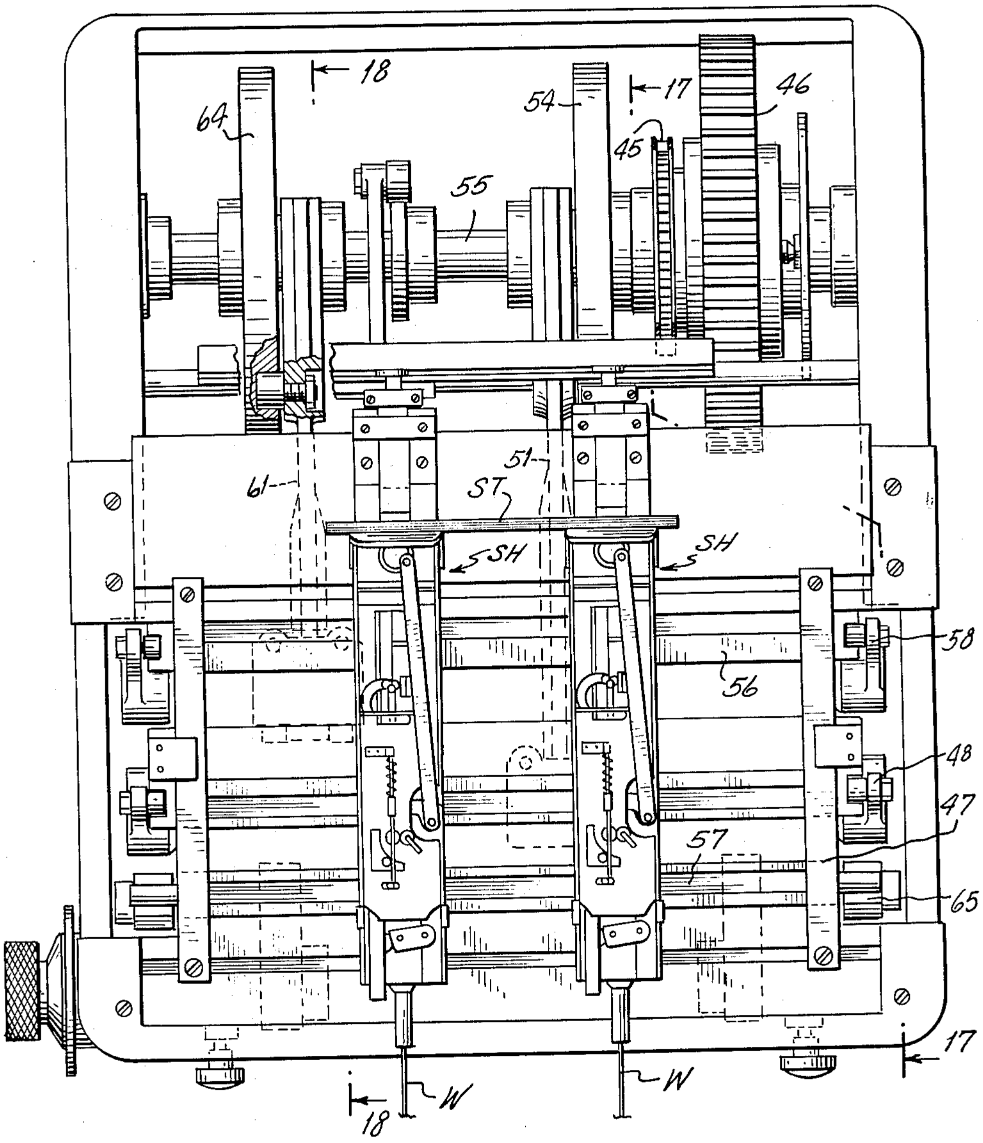
Figures 17, 18:
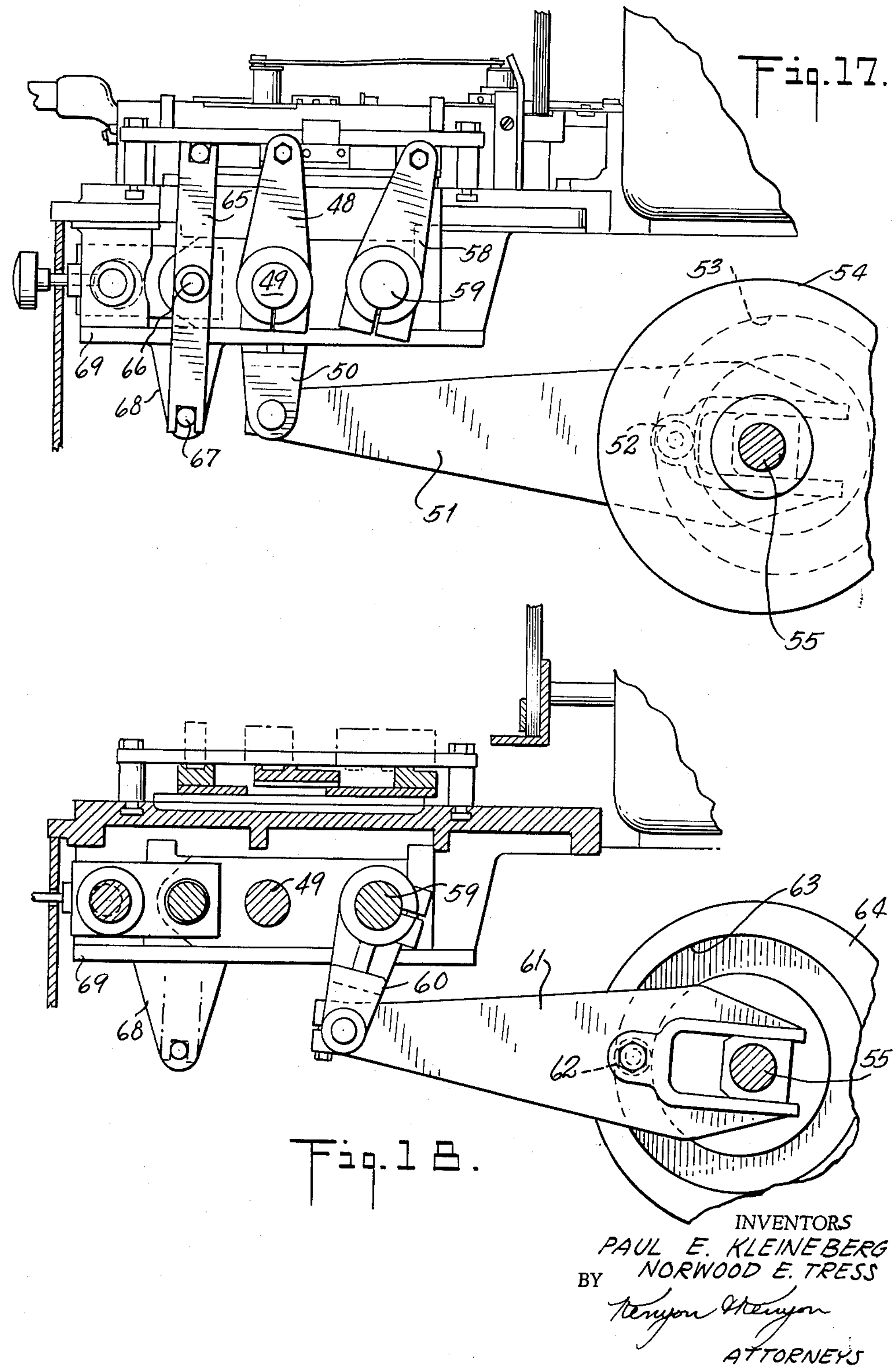
Figures 19, 20:
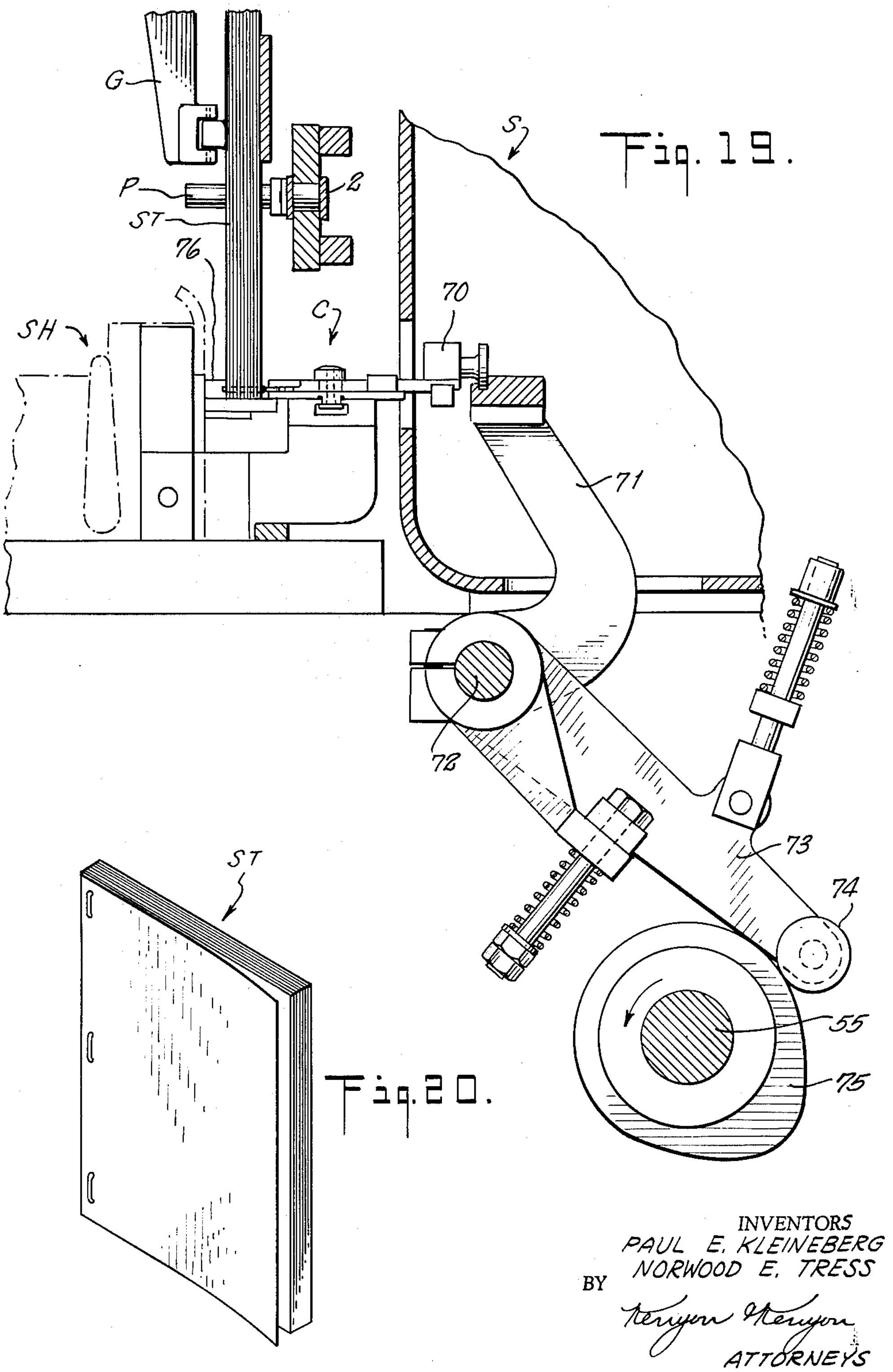

FIG. 5 is a side elevation of the new stitcher;

FIG. 6 is a plan view looking downwardly on the line 6—6 in FIG. 5;

FIG. 7 on an enlarged scale in side elevation shows the reciprocating signature stack gripper;

FIG. 8 is an end elevation of the stitcher looking at its end from which the stitched signature stacks are delivered;

FIG. 9 is a cross section taken on the line 9—9 in FIG. 7;

FIG. 10 is a longitudinal section taken on a vertical plane from the line 10—10 in FIG. 9;

FIG. 11 is a cross section taken on the line 11—11 in FIG. 10;

FIG. 12 is a view partly in elevation and partly in section taken on the line 12—12 in FIG. 11;

FIG. 13 on an enlarged scale in elevation shows details of the main pin chain looping arrangement effecting the delayed linear pin displacement;

FIG. 14 is a longitudinal section taken on a horizontal plane on the line 14—14 in FIG. 13;

FIG. 15 is a cross section taken on the line 15—15 in FIG. 13;

FIG. 16 is a plan view looking downwardly on the stitcher showing the stitching heads and their associated equipment exposed by removal of their cover;

FIG. 17 is a cross section taken on the line 17—17 in FIG. 16;

FIG. 18 is a cross section taken on the line 18—18 in FIG. 16;

FIG. 19 is a cross section showing the stitching head's staple leg clincher; and FIG. 20 shows the stitched stack of signatures which is ultimately covered to produce a book.

The series of four drawings, FIGS. 1–4, illustrate the basic operating principles as follows:

In FIG. 1, one of the signature stacks ST is being pushed forwardly by one of the main chain conveyor pins P and is approaching the stitcher S having the automatic stitching heads SH which, as explained previously, do not reciprocate in the traveling direction of the pin P. These heads remain stationary in this direction at all times. The gripper G is moving backwardly to the left toward the advancing signature stack ST, and one of the transfer pins TP, carried by a short loop of endless chain timed so that this pin moves at the same rate of speed and in the same direction as the main chain pin P, has just engaged the trailing edge of the stack ST.

Next, in FIG. 2, the pin P has detoured upwardly because the main chain is looped upwardly a short distance in front of the limit of the backward or lefthand stroke of the reciprocative gripper G. The transfer pin TP is pushing the stack ST onwardly from the pin P so that the stack becomes registered with the gripper G which then grips the stack. The manner in which the pin P is caused to detour is described later, it being sufficient now to note that the main chain moving the pin P is looped upwardly by sprocket wheels shown at the detour station D.

In FIG. 3 the gripper G has carried the stack ST beyond the extent of the travel of the transfer pin TP and into registration with the stitching heads SH. These heads now grip the signature stack near the ultimate book back zone and drive the stitching staples through the stack and clinch the staple legs. This view shows the pin P catching up with the now stationary stack ST.

Finally, in FIG. 4, the pin P, having now again engaged the back edge of the stack ST is pushing it onwardly from the stitcher while the gripper G is again starting backwardly to repeat the described cycle with respect to the next oncoming signature stack. This next stack is not shown in this drawing series to avoid confusion.

The balance of the drawings following FIG. 4 illustrate the details of the machine elements providing the above-described operation.

In FIG. 5, at the lefthand end, a portion of a signature gathering machine 1 is illustrated. This machine gathers or collates the signature stacks which, as they grow, are carried along by the pins P driven by the endless main chain 2. The stacks are turned into a vertical plane by a guide 3 with their backs facing downwardly and sliding in a trough. The general arrangement required for this is substantally the same throughout the length of the conveyor and may be understood by reference to FIG. 8 where the details are shown as they appear when looking at the delivery end of the stitcher. This shows the trough 4 supporting the book back edge of the signature stack and various guides 5 and 6 which hold the signature stack upright while permitting it to be slid along when pushed by the pin P engaging its trailing edge. The general location of the endless chain 7 which carries the transfer pins TP is also shown by FIG. 5.

Now, it should be kept in mind that the chain 2 is the main pin chain that runs to the left past the various gathering stations of the gathering machine. It must be driven, continuously, in this instance by a motor 8 which, through a sprocket wheel and sprocket chain drive 9, powers the main drive shaft 10 which powers both the gatherer and the stitcher. This drive shaft 10, through a sprocket wheel and sprocket chain drive 11 and right angle gearing in a gear box 12, continuously rotates the main pin chain driving sprocket 13. The chain 2 leaving the gatherer travels past the stitcher and loops backwardly reversely over sprocket wheels 14 to the sprocket wheel 13 which it then loops around to travel forwardly a short distance to be again looped backwardly by a sprocket wheel 15 so that it travels to the far end of the gatherer 1 where it loops around a sprocket wheel (not shown) to travel forwardly past the various gathering stations of the gatherer.

The stitcher S has a laterally projecting bracket 16 which mounts two sprocket wheels 17 and 18 located, relative to the sprocket wheel 14 and the other normal main pin chain sprocket wheels, to keep the chain 2 traveling linearly and horizontally to and from these two sprocket wheels 17 and 18. Between these sprocket wheels 17 and 18, the bracket 16 mounts a sprocket wheel 19 which establishes the upwardly loop in the chain 2 to provide for the detouring of each pin P as the chain travels past the station D. The linear displacement of each pin is thereby slowed, the degree of this slowing depending on the extent of the loop formed by the sprocket wheel 19 which is vertically adjustable.

The details of the above are shown on an enlarged scale by FIG. 13 which may now be referred to advantageously since it also illustrates the manner in which the transfer pin chain 7 is driven in time with the main chain 2. Thus the bracket 16 of the stitcher S also mounts sprocket wheels 20 and 21 located to keep the top span of the relatively short loop of chain 7 parallel to the main chain 2 excepting for the latter's loop. The bottom span of the chain 7 is looped upwardly over a sprocket wheel 22 which, as shown in detail by FIG. 15, is driven by a sprocket wheel and sprocket chain drive 23 by the sprocket wheel 18 under which the chain 2 loops at the station D.

The previously described guides 5 and 6 may be varied as required by their location. As shown by FIG. 14, at the station D the guide *6a* is in the form of a brush while the guide *6b* is a horizontally curving rod.

The sprocket chains 2 and 7 ride in guide-ways *2a* and *7a* as required for steadiness of travel.

The gripper G and its actuating elements are shown in detail by FIGS. 7–10. The gripper itself comprises an inner clamp jaw 24 sliding on a horizontal guide bar 25 and held against tilting by a guide roll 26 which runs in a horizontal trackway 27. This clamp jaw 24 mounts an outer clamp jaw 28 on a pivot pin 29, the jaw 28 being operated by an inwardly extending lever 30 swung by roller 31 riding in a horizontal extending trackway 32 mounted by lever arms 33. These lever arms are clamped on a horizontal shaft 34 reciprocated by a lever arm 35 through the action of a cam follower 36 riding on a suitably shaped rotary cam 37. In this fashion, the jaw 28 is clamped and unclamped on the signature stacks while the clamp reciprocates, timed as required to effect the previously described operation. The cam follower 36 is biased against the cam 37 by a lever arm 38 keyed to the shaft 34 and pulled downwardly by a tension coil spring 39.

The guide roll 26 connects with the inner clamp jaw 24 by way of a shaft 40 and between the two on this shaft is journaled a connecting rod 41. As shown by FIG. 10, this connecting rod connects the gripper with a crank 42 keyed to a shaft 43 which, through right angle gearing in a gear box 44, is driven by a sprocket wheel and sprocket chain drive 45 and an interposed speed reduction gearing 46 by the main drive shaft 10.

It is to be understood that all of the gearing is timed as required to effect the previously described operations.

This reciprocating gripper assembly is simple in construction and operation and, therefore, it can be reciprocated more rapidly than is possible in the case of the stitching heads and the mechanisms required for their operation when feeding the wire and forming the staples and driving them through the signature stacks and clinching the ends of the staples. This can be appreciated from the following description, keeping in mind that in the case of this invention none of these heavy working parts are reciprocated so as to move with the traveling signature stacks.

Referring now to FIGS. 16–19, the automatic stitching heads SH, only two being used in this instance, are shown mounted on the frame 47 reciprocated by the levers 48 mounted on a shaft 49 and powered by levers 50 working by connecting rods 51 driven by cam followers 52 riding in side cam recess 53 defined by cam wheels 54. The latter are keyed to the shaft 55 on which the larger of the two gears 46 is keyed. The stitching heads are mounted by the frame 47 so they may be adjusted laterally to stitch at the proper locations and it is possible for the frame to mount more than the stitching heads shown.

The wire feeding and the cutting and staple forming operations of the stitching heads are effected by the usual operating bars 56 and 57, the bar 56 being operated by a lever 58 keyed to a shaft 59 reciprocated by a lever 60 which is worked by a connecting rod 61 having a cam follower 62 riding in the side cam recess 63 of a cam 64 keyed to the shaft 55. The other bar 57 is reciprocated by a two-armed lever 65 pivoted to the reciprocating frame at 66, its lower extending arm being anchored by a pivot pin 67 mounted by a bracket 68 depending from the guide-way 69 in which the reciprocative frame 47 works. The wire W is fed to each stitching head from the usual wire spool in each instance (not shown).

As shown by FIG. 19, the staples' legs are clinched in the usual manner, but without the reciprocation required to travel with the signature stacks. The clincher assembly C is operated by a member 70 worked by a lever 71 keyed to a shaft 72 rotatively reciprocated by a cam lever 73 having a follower 74 riding a cam 75 keyed to the shaft 55. During stitching each signature stack is gripped between the part 76 and the front of the clincher assembly at each stitching head. A clincher is used for each stitching head and is adjustable as required for registration with the staples driven by that head.

The above is described briefly because although the details are well-known, the short review does serve to emphasize the number of parts involved, the relative complexity of their operation, and the relatively great mass which, before the present invention, was reciprocated as an entire unit to travel with the continuously moving signature stacks during the stitching operation. This is avoided by the present invention.

FIG. 20 shows the appearance of one side-stitched signature stack. Here three staples are shown. This would require the use of one more stitching head and clincher since only two of each are shown on the stitcher.

By mounting the stitching heads and all of their associated mechanisms stationarily with respect to the travel of the signature stacks, the stitching operation can be appreciably speeded. The problem involved by the need for the signature stacks to momentarily stand still during the stitching operation is solved by the simple reciprocating signature stack gripper mechanism which is relatively free from complexities and can be reciprocated at high speed. The problem of transferring the stacks from the pins of the main pin chain, which must travel continuously since it receives the signatures being collated by the gatherer, is solved by the simple detour effected by the looping of the main chain. Smoothness of transfer is assured by the transfer pin chain arrangement which carries the signature stacks onwardly when the linear displacement of the main pin chain is reduced in speed or delayed to give the gripper an opportunity to grip each stack and carry it to the stitching head station. Each stitched stack is removed promptly as its pin catches up with it and pushes it onwardly from the stitcher.

The timing is important. The main and transfer chains should travel at the same linear speed and their pins should register, excepting at the station D where the transfer chain should continue traveling at that linear speed. The gripper G must be ready to receive each transferred stack at the location where the transfer chain pins leave off, and must then grip each stack and continue its transfer to the stitching heads SH. The latter must then stitch each stack, this including operation of the clinchers, before the main chain pin which was pushing it up to the delay station D, catches up with this stack to carry it onwardly and clear it from the stitching heads, the gripper going back for the next stack during this interval.

The interspacing distance between the pins P is, of course, determined by the interspacing between the centerlines of the signature feeding stations of the gatherer. This interspacing must always be substantially greater than the extent of the signatures gathered. Inherently, this leaves room between each two of the main chain pins for the transfer action described hereinabove. Since the main chain pins, as well as the transfer chain pins push the signature stacks along in their supporting trough or guideway, the stacks are releasable from the pins and can be moved forwardly as required for the transfer action. After stitching each main chain pin catches up with its stack and again moves it onwardly so as to clear it from the stitcher. The transfer of each stack occurs during time intervals each permitting the transferred stack to have at least the momentary stationary relationship with the stitching heads before the detoured main chain pin which was moving that stack catches up with it to again move it as before.

The manner of making this machine offers no problems to any engineer familiar with this art, once he understands the principles of this invention. Therefore, it has not been described. The illustrated machine is at present believed to be the best mode of practicing this invention.

What is claimed is:

1. Apparatus for doing work on objects and including means for doing the work and requiring at least a momentary stationary relationship in one direction between this means and each object on which it does the work, a series of interspaced conveyor means each for releasably engaging one of the objects and moving it continuously and means for guiding this series in a traveling path in said direction and extending past the first-named means so that the latter can do its work on each object upon effecting said relationship therewith, means for causing said series of object-moving means to detour from said path in advance of the first-named means so as to slow the displacement of each of the means of this series in said direction, and means for successively transferring the objects ahead from the ones of this series of means moving them individually to the first-named means during time intervals each permitting each object to have said relationship with the first-named means at least momentarily before the detoured one of the series of means that was moving this object catches up therewith to again move this object.

2. The apparatus of claim 1 in which said series of interspaced means comprises means for slidingly supporting the objects and a traveling chain having interspaced abutments for engaging the trailing surfaces of the objects and pushing them along while slidingly supported, and the means for causing this series to detour comprises a plurality of rotary elements forming a transverse loop in this chain.

3. The apparatus of claim 1 in which said means for transferring the objects includes a second series of interspaced means each for releasably engaging one of the objects and moving it continuously in said direction past the detouring extent of the first-named series to a location therebeyond, and means reciprocating parallel with said direction between this location and the means for doing the work on the objects, and for carrying the objects to this means from said location and there releasing them during said time intervals.

4. The apparatus of claim 2 in which said means for transferring the objects includes a second series of interspaced means each for releasably engaging one of the objects and moving it continuously in said direction past the detouring extent of the first-named series to a location therebeyond, and means reciprocating parallel with said direction between this location and the means for doing the work on the objects, and for carrying the objects to this means from said location and there releasing them during said time intervals.

5. The apparatus of claim 4 in which said second series of interspaced means comprises a second traveling chain having interspaced abutments timed to register with the abutments of the first chain and for engaging the trailing surfaces of the objects and pushing them forwardly while slidingly supported, and said reciprocating means comprises a clamp and means for causing this clamp to grip the objects delivered by this second chain's abutments and to release the objects at said location.

6. A side stitcher for stacks of signatures pushed from a gatherer by the pins of its continuously traveling pin chain, said stitcher having at least one stitching head mounted stationarily with respect to the travel of said pin chain and including means for looping said pin chain before its pins reach this stitching head so that the linear advancing displacement of the chain pins is slowed for an interval of time and means for advancing each stack ahead of its moving chain pin during this interval to the stitching head fast enough for the stack to remain stationary during operation of the stitching head before re-engagement of this stack by the chain pin which was pushing it up to the chain looping location.

7. The side stitcher of claim 6 in which said advancing means comprises a second pin chain having a relatively short span running past said looping location and parallel to the gatherer's chain extending to and from this location and traveling at substantially the latter's speed, this second chain having pins registering with the gatherer's chain pins throughout said span and transferring the stacks past said looping location ahead of said slowed displacement of the gatherer's chain pins, a reciprocating signature stack gripper timed to register with each transferred stack and to move ahead of each advancing gatherer chain pin to said stitching heads, and means for causing said gripper to grip each transferred stack and to maintain this grip up to said stitching head and to release the stack at said head for operation of the latter prior to the stack being again re-engaged by the gatherer chain pin formerly pushing the stack.

8. The side stitcher of claim 6 in which said stack advancing means includes a reciprocatory stack gripper positioned to reciprocate between locations between said looping location and said stitching head and this head and having means for causing it to grip and hold each stack while moving it ahead of its moving pin and to release it at this head for operation of the latter prior to this catching up with this stack.

9. A signature side stitcher including means for mounting and operating stitching heads with the necessary reciprocation transversely with respect to signature stacks fed thereto but stationary with respect to such stack, a reciprocating gripper reciprocating parallel to the path of said stacks when moved through the stitcher between a forward stroke limit carrying a stack into registration with heads mounted by said means and a location spaced therefrom in the direction from which the stacks are fed, and means for effecting gripping operation of said gripper while moving from the first to the second-named location and released operation of the gripper while moving from the second to the first-named location; whereby the gripper may transfer stacks from the pins of a gatherer's pin chain ahead of the pins to give time for momentary stack stoppage at the second-named location.

10. In the combination of a signature gatherer, a signature side stitcher beyond the gatherer's delivery end and a pin chain running past the gatherer and having interspaced pins for gathering signatures fed by the gatherer and forming stacks pushed by these pins and which chain also runs past the stitcher to feed the stacks therethrough for side stitching and delivery therefrom, the improvement comprising means for forming a transverse loop in said chain between the gatherer and stitcher to slow the displacement rate of the chain and its pins, and means for carrying each stack ahead of the thusly slowed pin quickly enough to permit the stack to momentarily stand stationary at the stitcher long enough to permit its stitching by operation at the stitcher prior to this slowed pin regaining its normal displacement speed and catching up with this stack to deliver it from the stitcher.

No references cited.

GRANVILLE Y. CUSTER, JR., *Primary Examiner.*